United States Patent
Hung

(10) Patent No.: US 11,671,811 B2
(45) Date of Patent: Jun. 6, 2023

(54) BLUETOOTH COMMUNICATION SYSTEM AND RELATED BLUETOOTH DEVICES CAPABLE OF IMPLEMENTING AUTO-PAIRING FUNCTION WITHOUT SUPPORTING BLUETOOTH LOW ENERGY TECHNOLOGY

(71) Applicant: Realtek Semiconductor Corp., Hsinchu (TW)

(72) Inventor: Chia Chun Hung, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 17/529,559

(22) Filed: Nov. 18, 2021

(65) Prior Publication Data
US 2022/0167136 A1    May 26, 2022

Related U.S. Application Data

(60) Provisional application No. 63/117,396, filed on Nov. 23, 2020.

(30) Foreign Application Priority Data

Sep. 30, 2021    (TW) .................... 110136569

(51) Int. Cl.
H04W 4/80     (2018.01)
H04B 1/40     (2015.01)
H04W 76/10    (2018.01)

(52) U.S. Cl.
CPC ............... H04W 4/80 (2018.02); H04B 1/40 (2013.01); H04W 76/10 (2018.02)

(58) Field of Classification Search
CPC ....... H04W 4/80; H04W 76/10; H04W 76/14; H04W 84/18; H04B 1/40
(Continued)

(56) References Cited

U.S. PATENT DOCUMENTS 10,645,740 B2   5/2020   Liu
11,019,669 B2   5/2021   Liu
(Continued)

FOREIGN PATENT DOCUMENTS

TW    201540004 A    10/2015

OTHER PUBLICATIONS

Taiwanese Office Action and Search Report for Taiwanese Application No. 110136568, dated Jan. 25, 2022, with English translation.
(Continued)

*Primary Examiner* — Eugene Yun
(74) *Attorney, Agent, or Firm* — Birch, Stewart, Kolasch & Birch, LLP

(57) ABSTRACT

A Bluetooth communication system includes: an inquirer-side Bluetooth device arranged to operably generate and transmit a Bluetooth inquiry request; and a requester-side Bluetooth device arranged to operably receive and parse the Bluetooth inquiry request, and to operably generate and transmit a Frequency Hop Synchronization (FHS) packet containing a requester-side Bluetooth address and an Extended Inquiry Response (EIR) packet containing an auto-pairing request to the inquirer-side Bluetooth device. The inquirer-side Bluetooth device conducts an auto-pairing procedure with the requester-side Bluetooth device according to the contents of FHS packet and the EIR packet, but at least one of the inquirer-side Bluetooth device and the requester-side Bluetooth device does not support Bluetooth Low Energy (BLE) technology.

10 Claims, 4 Drawing Sheets

(58) Field of Classification Search
USPC .......................................................... 455/41.2
See application file for complete search history.

(56) References Cited

U.S. PATENT DOCUMENTS

| 2012/0257508 | A1 | 10/2012 | Reunämaki et al. |
| 2012/0289160 | A1 | 11/2012 | Palin et al. |
| 2015/0296329 | A1 | 10/2015 | Mao et al. |

OTHER PUBLICATIONS

Taiwanese Office Action and Search Report for Taiwanese Application No. 110136569, dated Dec. 29, 2021, with English translation of Taiwanese Search Report.
Taiwanese Notice of Allowance dated Sep. 28, 2022 for Application No. 110136569 with an English translation.

BLUETOOTH COMMUNICATION SYSTEM AND RELATED BLUETOOTH DEVICES CAPABLE OF IMPLEMENTING AUTO-PAIRING FUNCTION WITHOUT SUPPORTING BLUETOOTH LOW ENERGY TECHNOLOGY

CROSS-REFERENCE TO RELATED APPLICATIONS

This application claims the benefit of priority to Patent Application No. 110136569, filed in Taiwan on Sep. 30, 2021; the entirety of which is incorporated herein by reference for all purposes.

This application claims the benefit of priority to U.S. Provisional Application Ser. No. 63/117,396, filed on Nov. 23, 2020; the entirety of which is incorporated herein by reference for all purposes.

BACKGROUND

The disclosure generally relates to a Bluetooth communication technology and, more particularly, to a Bluetooth communication system and related Bluetooth devices capable of implementing auto-pairing function without supporting Bluetooth Low Energy technology.

To simplify the pairing procedure between Bluetooth devices, many Bluetooth auto-pairing technologies have been developed, such as the Bluetooth auto-pairing technologies disclosed in U.S. Pat. Nos. 10,645,740 and 11,019,669. In the aforementioned patents, two Bluetooth devices to be paired have to transmit related data or instructions through particular Bluetooth advertising packets, in order to initiate associated auto-pairing procedures.

However, according to the aforementioned patents, the two Bluetooth devices have to respectively switch to particular operation modes to transmit or receive particular Bluetooth advertising packets before they conduct the auto-pairing procedure Therefore, the related control is more complicated, and the time required to complete the entire auto-pairing procedure may not meet the requirement of certain applications where the Bluetooth pairing procedure is required to be completed in a shorter period of time.

On the other hand, it is well known that only Bluetooth devices that support Bluetooth Low Energy (BLE) technology can transmit and parse Bluetooth advertising packets. In other words, if the Bluetooth chips and Bluetooth devices cannot support BLE technology, it is difficult for the Bluetooth chips and Bluetooth devices to implement the auto-pairing functionality by adopting the approaches disclosed in the aforementioned patents.

SUMMARY

An example embodiment of a Bluetooth communication system is disclosed, comprising: an inquirer-side Bluetooth device, comprising: an inquirer-side Bluetooth transceiver circuit; an inquirer-side packet parsing circuit, coupled with the inquirer-side Bluetooth transceiver circuit; and an inquirer-side control circuit, coupled with the inquirer-side Bluetooth transceiver circuit and the inquirer-side packet parsing circuit, and arranged to operably generate a Bluetooth inquiry request and control the inquirer-side Bluetooth transceiver circuit to send the Bluetooth inquiry request; and a requester-side Bluetooth device, comprising: a requester-side Bluetooth transceiver circuit, arranged to operably receive the Bluetooth inquiry request; a requester-side packet parsing circuit, coupled with the requester-side Bluetooth transceiver circuit, and arranged to operably parse the Bluetooth inquiry request received by the requester-side Bluetooth transceiver circuit; and a requester-side control circuit, coupled with the requester-side Bluetooth transceiver circuit and the requester-side packet parsing circuit, and arranged to operably generate a FHS (Frequency Hop Synchronization) packet comprising a requester-side Bluetooth address and an EIR (Extended Inquiry Response) packet comprising an auto-pairing request after the requester-side packet parsing circuit parses the Bluetooth inquiry request, and to operably control the requester-side Bluetooth transceiver circuit to transmit the FHS packet and the EIR packet to the inquirer-side Bluetooth transceiver circuit; wherein the inquirer-side Bluetooth transceiver circuit is arranged to operably receive the FHS packet and the EIR packet so that the inquirer-side Bluetooth device conducts an auto-pairing procedure with the requester-side Bluetooth device; wherein at least one of the requester-side Bluetooth device and the inquirer-side Bluetooth device does not support BLE (Bluetooth Low Energy) technology.

Another example embodiment of an inquirer-side Bluetooth device of a Bluetooth communication system is disclosed, comprising: an inquirer-side Bluetooth transceiver circuit; an inquirer-side packet parsing circuit, coupled with the inquirer-side Bluetooth transceiver circuit; and an inquirer-side control circuit, coupled with the inquirer-side Bluetooth transceiver circuit and the inquirer-side packet parsing circuit, and arranged to operably generate a Bluetooth inquiry request and control the inquirer-side Bluetooth transceiver circuit to send the Bluetooth inquiry request, wherein after a requester-side Bluetooth device of the Bluetooth communication system receives the Bluetooth inquiry request, the requester-side Bluetooth device transmits a FHS (Frequency Hop Synchronization) packet comprising a requester-side Bluetooth address and an EIR (Extended Inquiry Response) packet comprising an auto-pairing request to the inquirer-side Bluetooth device; wherein the inquirer-side Bluetooth transceiver circuit is arranged to operably receive the FHS packet and the EIR packet so that the inquirer-side Bluetooth device conducts an auto-pairing procedure with the requester-side Bluetooth device; wherein at least one of the requester-side Bluetooth device and the inquirer-side Bluetooth device does not support BLE (Bluetooth Low Energy) technology.

Another example embodiment of a requester-side Bluetooth device of a Bluetooth communication system is disclosed, comprising: a requester-side Bluetooth transceiver circuit, arranged to operably receive a Bluetooth inquiry request transmitted from an inquirer-side Bluetooth device of the Bluetooth communication system; a requester-side packet parsing circuit, coupled with the requester-side Bluetooth transceiver circuit, and arranged to operably parse the Bluetooth inquiry request received by the requester-side Bluetooth transceiver circuit; and a requester-side control circuit, coupled with the requester-side Bluetooth transceiver circuit and the requester-side packet parsing circuit, and arranged to operably generate a FHS (Frequency Hop Synchronization) packet comprising a requester-side Bluetooth address and an EIR (Extended Inquiry Response) packet comprising an auto-pairing request after the requester-side packet parsing circuit parses the Bluetooth inquiry request, and to operably control the requester-side Bluetooth transceiver circuit to transmit the FHS packet and the EIR packet to the inquirer-side Bluetooth device, so that the inquirer-side Bluetooth device conducts an auto-pairing procedure with the requester-side Bluetooth device; wherein at least one of the requester-side Bluetooth device and the inquirer-side Bluetooth device does not support BLE (Bluetooth Low Energy) technology.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
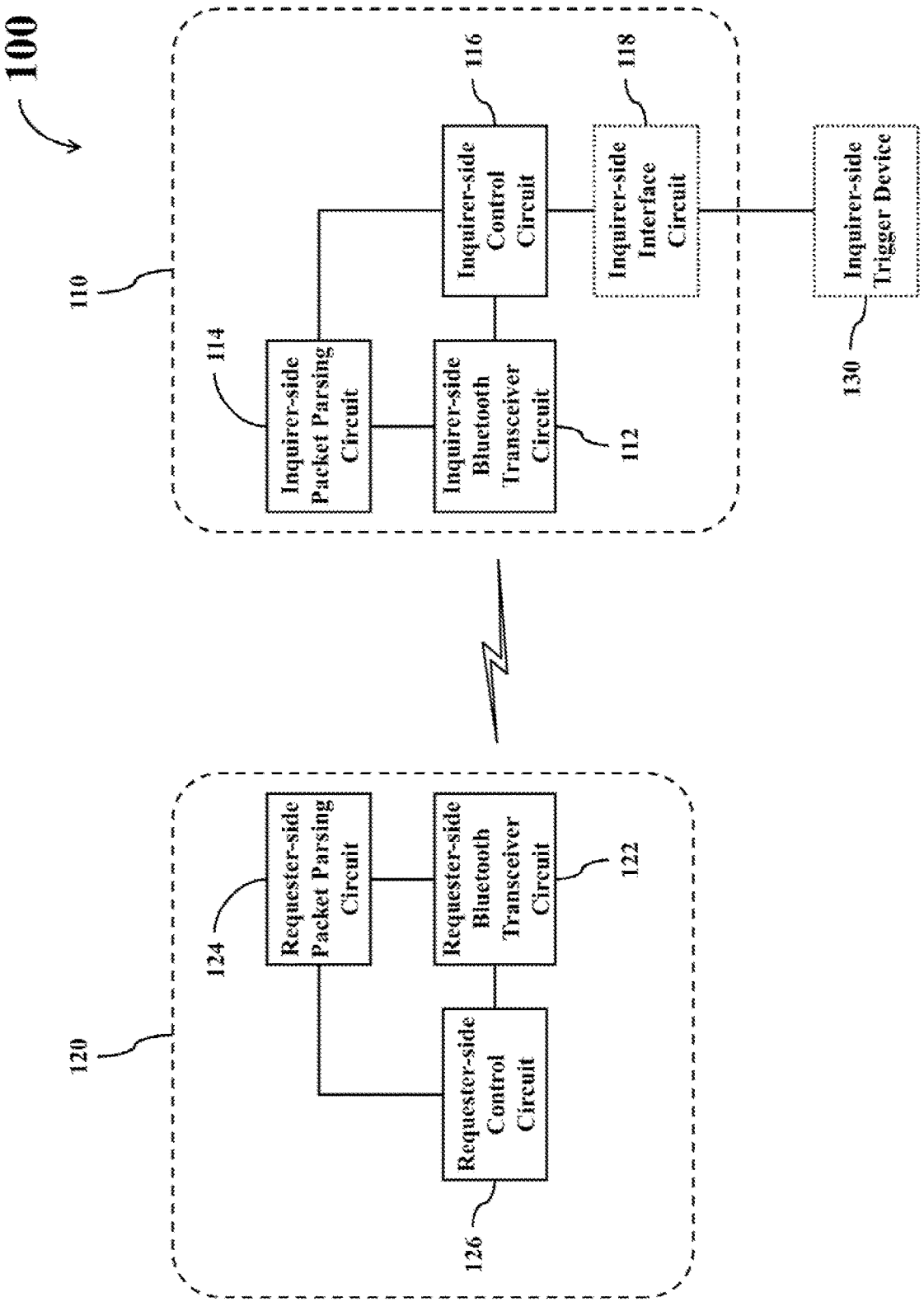
FIG. 1 shows a simplified functional block diagram of a Bluetooth communication system according to a first embodiment of the present disclosure.

FIG. 1 shows a simplified functional block diagram of a Bluetooth communication system 100 according to a first embodiment of the present disclosure. The Bluetooth communication system 100 comprises an inquirer-side Bluetooth device 110 and a requester-side Bluetooth device 120. In the embodiment of FIG. 1, the inquirer-side Bluetooth device 110 comprises an inquirer-side Bluetooth transceiver circuit 112, an inquirer-side packet parsing circuit 114, an inquirer-side control circuit 116, and an inquirer-side interface circuit 118. The requester-side Bluetooth device 120 comprises a requester-side Bluetooth transceiver circuit 122, a requester-side packet parsing circuit 124, and a requester-side control circuit 126.

In practice, each of the inquirer-side Bluetooth device 110 and the requester-side Bluetooth device 120 may be a stand-alone device or may be partial circuits integrated into other devices.

In the inquirer-side Bluetooth device 110, the inquirer-side Bluetooth transceiver circuit 112 is arranged to operably receive and transmit Bluetooth packets in different Bluetooth channels. The inquirer-side packet parsing circuit 114 is coupled with the inquirer-side Bluetooth transceiver circuit 112, and arranged to operably parse the Bluetooth packets received by the inquirer-side Bluetooth transceiver circuit 112, so as to extract data, instructions, and/or messages in the Bluetooth packets. The inquirer-side control circuit 116 is coupled with the inquirer-side Bluetooth transceiver circuit 112 and the inquirer-side packet parsing circuit 114, and arranged to operably control operations of the inquirer-side Bluetooth transceiver circuit 112 and the inquirer-side packet parsing circuit 114. The inquirer-side interface circuit 118 is coupled with the inquirer-side control circuit 116 and an inquirer-side trigger device 130, and arranged to operably receive a trigger signal generated by the inquirer-side trigger device 130 and to operably inform the inquirer-side control circuit 116 when receiving the trigger signal generated by the inquirer-side trigger device 130.

In practice, different functional blocks of the aforementioned inquirer-side Bluetooth device 110 may be realized with separate circuits or may be integrated into a single Bluetooth communication chip. In addition, if necessary, the inquirer-side Bluetooth transceiver circuit 112 may be coupled with additional antenna devices (not shown in the figures).

The aforementioned inquirer-side trigger device 130 may be realized with various devices capable of generating a corresponding trigger signal in response to the user's simple manipulation, such as a button, a switch, a remote control, a touch screen, a voice-activated device, a gesture sensing device, a gyroscope, a circuit adopting other trigger signal generating technology, or a combination of the above devices. In practice, the inquirer-side trigger device 130 may be arranged outside of the inquirer-side Bluetooth device 110, or may be integrated with part of or all of the functional blocks of the inquirer-side Bluetooth device 110.

In the requester-side Bluetooth device 120, the requester-side Bluetooth transceiver circuit 122 is arranged to operably receive and transmit Bluetooth packets in different Bluetooth channels. The requester-side packet parsing circuit 124 is coupled with the requester-side Bluetooth transceiver circuit 122 and arranged to operably parse the Bluetooth packets received by the requester-side Bluetooth transceiver circuit 122, so as to extract data, instructions, and/or messages in the Bluetooth packets. The requester-side control circuit 126 is coupled with the requester-side Bluetooth transceiver circuit 122 and the requester-side packet parsing circuit 124, and arranged to operably control operations of the requester-side Bluetooth transceiver circuit 122 and the requester-side packet parsing circuit 124.

In practice, different functional blocks in the requester-side Bluetooth device 120 may be realized with separate circuits or may be integrated into a single Bluetooth communication chip. In addition, if necessary, the requester-side Bluetooth transceiver circuit 122 may be coupled with additional antenna devices (not shown in the figures).

It is well known that Bluetooth communication series standard only specifies a general Bluetooth device pairing procedure that requires a user to intervene (e.g., the user may need to select a target device to be paired from a list of available devices), but does not specify how to conduct auto-pairing procedure between two Bluetooth devices without the user's intervention.

As described previously, the existing Bluetooth auto-pairing technology utilizes particular Bluetooth advertising packets to transmit information required for auto-pairing, such as auxiliary advertising indication (AUX_ADV_IND) packets, extended advertising indication (ADV_EXT_IND) packets, auxiliary chain indication (AUX_CHAIN_IND) packets, auxiliary scan response (AUX_SCAN_RSP) packets, auxiliary synchronous indication (AUX_SYNC_IND) packets, or the like.

In order to generate or parse the aforementioned particular Bluetooth advertising packets, the existing Bluetooth auto-pairing technology also requires the two Bluetooth devices to respectively switch to particular operation modes before they conduct the auto-pairing procedure, such as the LE Extended Passive Scan mode, the LE Extended Active Scan mode, the LE Extended Initiator mode, the Scannable mode, and the Periodic Advertising mode. In addition, the operation modes of the two Bluetooth devices have to be a particular combination.

Obviously, the existing Bluetooth auto-pairing technology is more complicated in related control procedure, and the two Bluetooth devices can conduct the auto-pairing procedure only if they can support the BLE technology introduced by the Bluetooth 4.0 standard.

In order to resolve the defect of the existing Bluetooth auto-pairing technology, the disclosed Bluetooth communication system 100 will utilize a different mechanism to implement the auto-pairing functionality.

Figure 2:
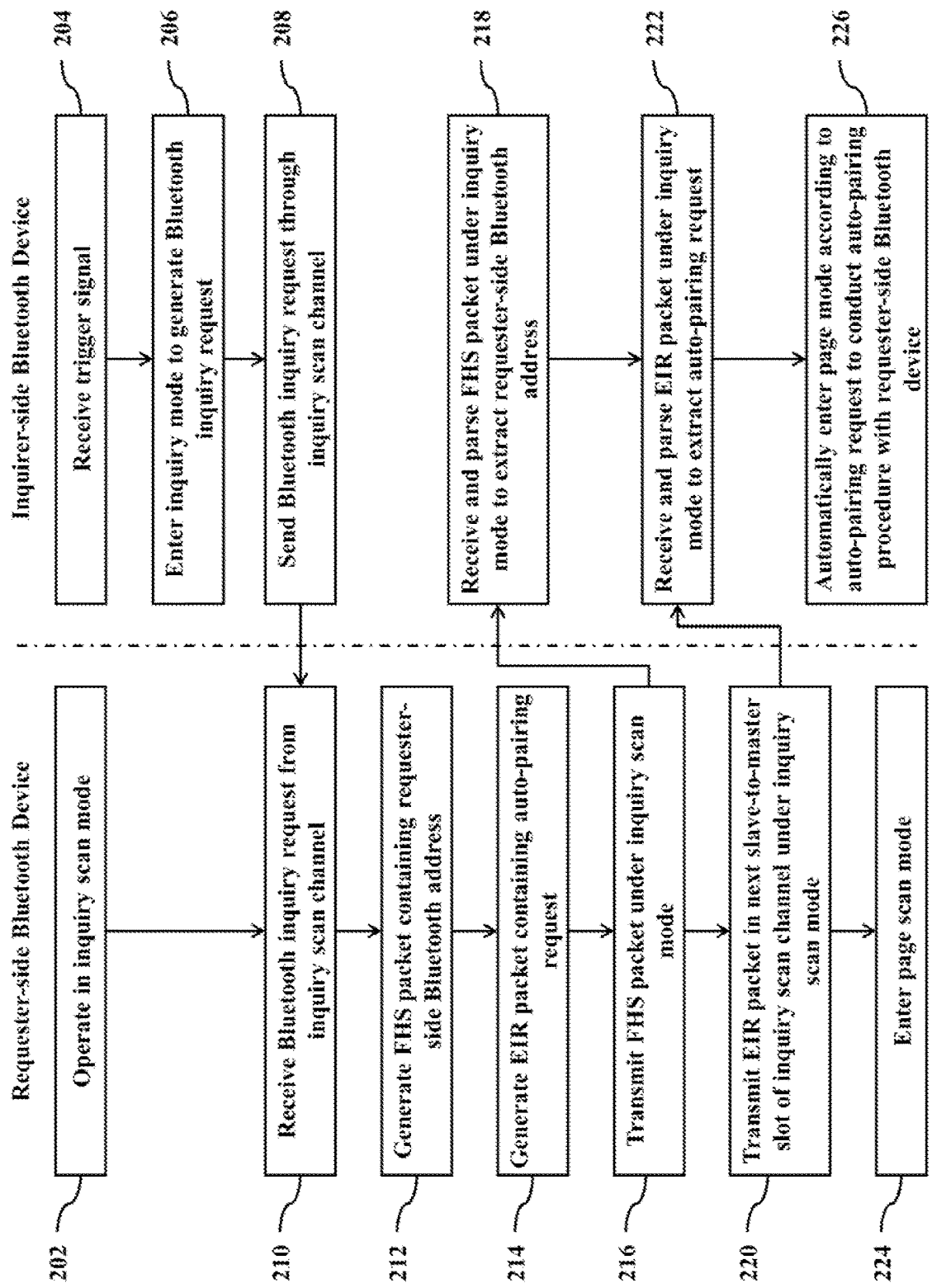
FIG. 2 shows a simplified flowchart of a method for conducting auto-pairing between Bluetooth devices according to a first embodiment of the present disclosure.

The pairing approach of the Bluetooth devices in the Bluetooth communication system 100 will be further described below by reference to FIG. 2. FIG. 2 shows a simplified flowchart of a method for conducting auto-pairing between Bluetooth devices according to a first embodiment of the present disclosure.

In the flowchart of FIG. 2, operations within a column under the name of a specific device are operations to be performed by the specific device. For example, operations within a column under the label "inquirer-side Bluetooth device" are operations to be performed by the inquirer-side Bluetooth device 110; operations within a column under the label "requester-side Bluetooth device" are operations to be performed by the requester-side Bluetooth device 120. The same analogous arrangement also applies to the subsequent flowcharts.

In the operations, the requester-side control circuit 126 of the requester-side Bluetooth device 120 may perform operation 202 in an appropriate time point based on user's manipulation or operating instructions of internal programs.

In the operation 202, the requester-side control circuit 126 controls the requester-side Bluetooth transceiver circuit 122 to enter an inquiry scan mode so as to detect whether there is any other Bluetooth device nearby sending a Bluetooth inquiry request.

In this situation, if the user wants to utilize the inquirer-side Bluetooth device 110 to conduct the Bluetooth auto-pairing procedure with the requester-side Bluetooth device 120, then the user may conduct a particular manipulation to the inquirer-side trigger device 130 to cause the inquirer-side trigger device 130 to generate a corresponding trigger signal. In this situation, the inquirer-side interface circuit 118 performs operation 204 to receive the trigger signal generated by the inquirer-side trigger device 130 and inform the inquirer-side control circuit 116.

When the inquirer-side control circuit 116 receives the notification transmitted from the inquirer-side interface circuit 118, the inquirer-side control circuit 116 performs operation 206 to enter an inquiry mode, so as to generate a Bluetooth inquiry request containing a Bluetooth address of the inquirer-side Bluetooth device 110 (hereinafter referred to as an inquirer-side Bluetooth address). In practice, the inquirer-side control circuit 116 may fill other data or messages into the aforementioned Bluetooth inquiry request based on functionality design requirement.

In operation 208, the inquirer-side control circuit 116 controls the inquirer-side Bluetooth transceiver circuit 112 to send the Bluetooth inquiry request to other Bluetooth devices nearby through an inquiry scan channel under the inquiry mode.

In operation 210, the requester-side Bluetooth transceiver circuit 122 of the requester-side Bluetooth device 120 receives the Bluetooth inquiry request transmitted from the inquirer-side Bluetooth transceiver circuit 112 from the aforementioned inquiry scan channel under the inquiry scan mode. In this situation, the requester-side packet parsing circuit 124 parses the Bluetooth inquiry request transmitted from the inquirer-side Bluetooth transceiver circuit 112 to obtain the Bluetooth address of the inquirer-side Bluetooth device 110.

In operation 212, the requester-side control circuit 126 of the requester-side Bluetooth device 120 generates a Frequency Hop Synchronization (FHS) packet containing the Bluetooth address of the requester-side Bluetooth device 120 (hereinafter referred to as a requester-side Bluetooth address).

The requester-side Bluetooth device 120 may have one or more Bluetooth addresses depending on the Bluetooth standards supported by the requester-side Bluetooth device 120. For example, in the embodiment where the requester-side Bluetooth device 120 only supports the Bluetooth 2.0 standard, the requester-side Bluetooth device 120 may only have a single Bluetooth address. For another example, in the embodiment where the requester-side Bluetooth device 120 supports both the Bluetooth 2.0 standard and the Bluetooth 4.0 standard (or the Bluetooth 5.0 standard or the Bluetooth 5.3 standard), the requester-side Bluetooth device 120 may have two different Bluetooth addresses at the same time. In the operation 212, the requester-side control circuit 126 may fill part of or all of the Bluetooth addresses of the requester-side Bluetooth device 120 into one or more predetermined fields of the aforementioned FHS packet. In practice, the requester-side control circuit 126 may fill other data or messages into the aforementioned FHS packet based on the functionality design requirement.

In operation 214, the requester-side control circuit 126 generates an Extended Inquiry Response (EIR) packet containing an auto-pairing request. The aforementioned auto-pairing request in the EIR packet refers to various indication messages or instructions that require another Bluetooth device to actively conduct the Bluetooth auto-pairing procedure with the requester-side Bluetooth device 120. In practice, the requester-side control circuit 126 may fill the auto-pairing request into one or more predetermined fields of the aforementioned EIR packet.

In operation 216, the requester-side control circuit 126 controls the requester-side Bluetooth transceiver circuit 122 to transmit the FHS packet to the inquirer-side Bluetooth transceiver circuit 112 through the aforementioned inquiry scan channel under the inquiry scan mode.

In this situation, the inquirer-side Bluetooth transceiver circuit 112 performs operation 218 to receive the FHS packet transmitted from the requester-side Bluetooth transceiver circuit 122 under the inquiry mode, and the inquirer-side packet parsing circuit 114 parses the FHS packet received by the inquirer-side Bluetooth transceiver circuit 112, so as to extract the aforementioned requester-side Bluetooth address from the FHS packet.

In addition, after the requester-side Bluetooth transceiver circuit 122 transmits the aforementioned FHS packet to the inquirer-side Bluetooth transceiver circuit 112, the requester-side control circuit 126 performs operation 220.

In the operation 220, the requester-side control circuit 126 controls the requester-side Bluetooth transceiver circuit 122 to immediately transmit the EIR packet to the inquirer-side Bluetooth transceiver circuit 112 through the aforementioned inquiry scan channel in the next slave-to-master slot of the aforementioned inquiry scan channel under the inquiry scan mode.

In other words, the requester-side Bluetooth transceiver circuit 122 directly transmits the EIR packet containing the auto-pairing request in the original format of the EIR packet to the inquirer-side Bluetooth transceiver circuit 112 through the aforementioned inquiry scan channel without converting the EIR packet into the format of other Bluetooth advertising packets in advance. It can be clearly appreciated from the aforementioned descriptions that the requester-side Bluetooth transceiver circuit 122 can receive the Bluetooth inquiry request transmitted from the inquirer-side Bluetooth transceiver circuit 112 under the inquiry scan mode, and can also transmit the FHS packet and the EIR packet to the inquirer-side Bluetooth transceiver circuit 112 under the inquiry scan mode. Apparently, when the requester-side Bluetooth device 120 operates in the inquiry scan mode, the requester-side control circuit 126 is enabled to transmit the aforementioned auto-pairing request and requester-side Bluetooth address to the inquirer-side Bluetooth device 110 through the requester-side Bluetooth transceiver circuit 122, and the requester-side control circuit 126 does not need to and does not switch the operation mode of the requester-side Bluetooth transceiver circuit 122 before transmitting the aforementioned auto-pairing request and requester-side Bluetooth address.

In this situation, the inquirer-side Bluetooth transceiver circuit 112 performs operation 222 to receive the EIR packet transmitted from the requester-side Bluetooth transceiver circuit 122 under the inquiry mode, and the inquirer-side packet parsing circuit 114 parses the EIR packet received by the inquirer-side Bluetooth transceiver circuit 112 to extract the aforementioned auto-pairing request from the EIR packet. It can be clearly appreciated from the aforementioned descriptions that the inquirer-side Bluetooth transceiver circuit 112 can send the Bluetooth inquiry request under the inquiry mode, and can also receive the FHS packet and the EIR packet transmitted from the requester-side Bluetooth transceiver circuit 122 under the inquiry mode. In other words, when the inquirer-side Bluetooth device 110 operates in the inquiry mode, the inquirer-side control circuit 116 is enabled to receive the auto-pairing request and the requester-side Bluetooth address transmitted from the requester-side Bluetooth transceiver circuit 122, and the inquirer-side control circuit 116 does not need to and does not switch the operation mode of the inquirer-side Bluetooth transceiver circuit 112 before receiving the auto-pairing request and the requester-side Bluetooth address.

Since the aforementioned requester-side Bluetooth transceiver circuit 122 immediately transmits the EIR packet to the inquirer-side Bluetooth transceiver circuit 112 in the next slave-to-master slot of the inquiry scan channel, after the inquirer-side Bluetooth transceiver circuit 112 receives the aforementioned FHS packet, the inquirer-side Bluetooth transceiver circuit 112 will receive the EIR packet transmitted from the inquirer-side Bluetooth transceiver circuit 112 through the inquiry scan channel in the next slave-to-master slot of the inquiry scan channel.

Then, the requester-side control circuit 126 performs operation 224 to control the requester-side Bluetooth transceiver circuit 122 to enter a page scan mode, so as to wait for the inquirer-side Bluetooth device 110 to page the requester-side Bluetooth device 120.

On the other hand, the inquirer-side control circuit 116 performs operation 226 to automatically control the inquirer-side Bluetooth transceiver circuit 112 to enter a page mode according to the received auto-pairing request, so as to conduct the auto-pairing procedure with the requester-side Bluetooth device 120. In the operations, the inquirer-side control circuit 116 may control the inquirer-side Bluetooth transceiver circuit 112 to transmit a page request to the requester-side Bluetooth transceiver circuit 122 through a page scan channel according to the aforementioned auto-pairing request and the aforementioned requester-side Bluetooth address.

After the requester-side Bluetooth transceiver circuit 122 receives the page request transmitted from the inquirer-side Bluetooth transceiver circuit 112 through the aforementioned page scan channel, one or more Bluetooth connections may be established in one or more particular channels between the inquirer-side Bluetooth transceiver circuit 112 and the requester-side Bluetooth transceiver circuit 122. As a result, the Bluetooth auto-pairing procedure between the inquirer-side Bluetooth device 110 and the requester-side Bluetooth device 120 is completed.

For example, in the embodiment where both the inquirer-side Bluetooth device 110 and the requester-side Bluetooth device 120 only support the Bluetooth 2.0 standard, the inquirer-side control circuit 116 and the requester-side control circuit 126 may establish a basic rate bond (BR bond) or an enhanced data rate bond (EDR bond) in the operation 226. For another example, in the embodiment where the inquirer-side Bluetooth device 110 and the requester-side Bluetooth device 120 both support the Bluetooth 2.0 standard and the Bluetooth 4.0 standard (or the Bluetooth 5.0 standard or the Bluetooth 5.3 standard), the inquirer-side control circuit 116 and the requester-side control circuit 126 can establish an BLE bond in addition to a BR bond or an EDR bond in the aforementioned operation 226.

The inquirer-side control circuit 116 can learn from the aforementioned auto-pairing request that the requester-side Bluetooth device 120 corresponding to the aforementioned requester-side Bluetooth address permits other Bluetooth devices to conduct Bluetooth pairing with the requester-side Bluetooth device 120. Therefore, the inquirer-side control circuit 116 automatically tries to conduct the Bluetooth pairing procedure with the Bluetooth circuit corresponding to each received requester-side Bluetooth address through the inquirer-side Bluetooth transceiver circuit 112, and does not generate a list of Bluetooth devices available for connection for the user to select. In other words, the operations of the inquirer-side Bluetooth device 110 and the requester-side Bluetooth device 120 in the operation 226 do not require any user's intervention.

As can be appreciated from the foregoing descriptions, when the requester-side Bluetooth device 120 operates in the inquiry scan mode, the user only needs to conduct a simple manipulation (e.g., press a button, turn on a switch, or the like) to the inquirer-side trigger device 130 coupled with the inquirer-side Bluetooth device 110, then the inquirer-side Bluetooth device 110 will automatically initiate the Bluetooth pairing procedure with the requester-side Bluetooth device 120 and establish associated Bluetooth connections. In the entire Bluetooth auto-pairing procedure, the user does not need to issue any Bluetooth device scanning instructions, nor does the user need to select a target device to be paired, and thus it can significantly reduce the user's involvement.

Therefore, the aforementioned structure of the Bluetooth communication system 100 and the Bluetooth auto-pairing method adopted by the Bluetooth communication system 100 can effectively simplify the Bluetooth pairing procedure between the inquirer-side Bluetooth device 110 and the requester-side Bluetooth device 120, thereby improving the utilization convenience for the user.

From another aspect, in the aforementioned embodiments of FIG. 1 and FIG. 2, both the inquirer-side Bluetooth device 110 and the requester-side Bluetooth device 120 do not need to be provided with any display device, so the hardware structure, weight, and volume of both the inquirer-side Bluetooth device 110 and the requester-side Bluetooth device 120 can be significantly simplified.

In addition, since the aforementioned inquirer-side Bluetooth device 110 and requester-side Bluetooth device 120 do not need to utilized Bluetooth advertising packets to transmit data required for the auto-pairing procedure, the inquirer-side Bluetooth device 110 and requester-side Bluetooth device 120 do not need to switch to particular operation modes for transmitting or receiving Bluetooth advertising packets. Therefore, in the aforementioned Bluetooth communication system 100, the auto-pairing procedure between the inquirer-side Bluetooth device 110 and the requester-side Bluetooth device 120 can be accomplished in a shorter period of time.

Moreover, as described previously, if the Bluetooth chips and Bluetooth devices cannot support BLE technology, it is difficult for the Bluetooth chips and Bluetooth devices to implement the auto-pairing functionality by adopting the conventional approaches. In comparison, by adopting the aforementioned approach described in FIG. 2, even if either the inquirer-side Bluetooth device 110 or the requester-side Bluetooth device 120 does not support the BLE technology, or both the inquirer-side Bluetooth device 110 and the requester-side Bluetooth device 120 do not support the BLE technology, the auto-pairing functionality can still be implemented in the Bluetooth communication system 100.

Please note that the aforementioned architecture where the user triggers the inquirer-side Bluetooth device 110 to automatically initiate the Bluetooth pairing procedure through the inquirer-side trigger device 130 is merely an exemplary embodiment, rather than a restriction to the practical implementations.

Figure 3:
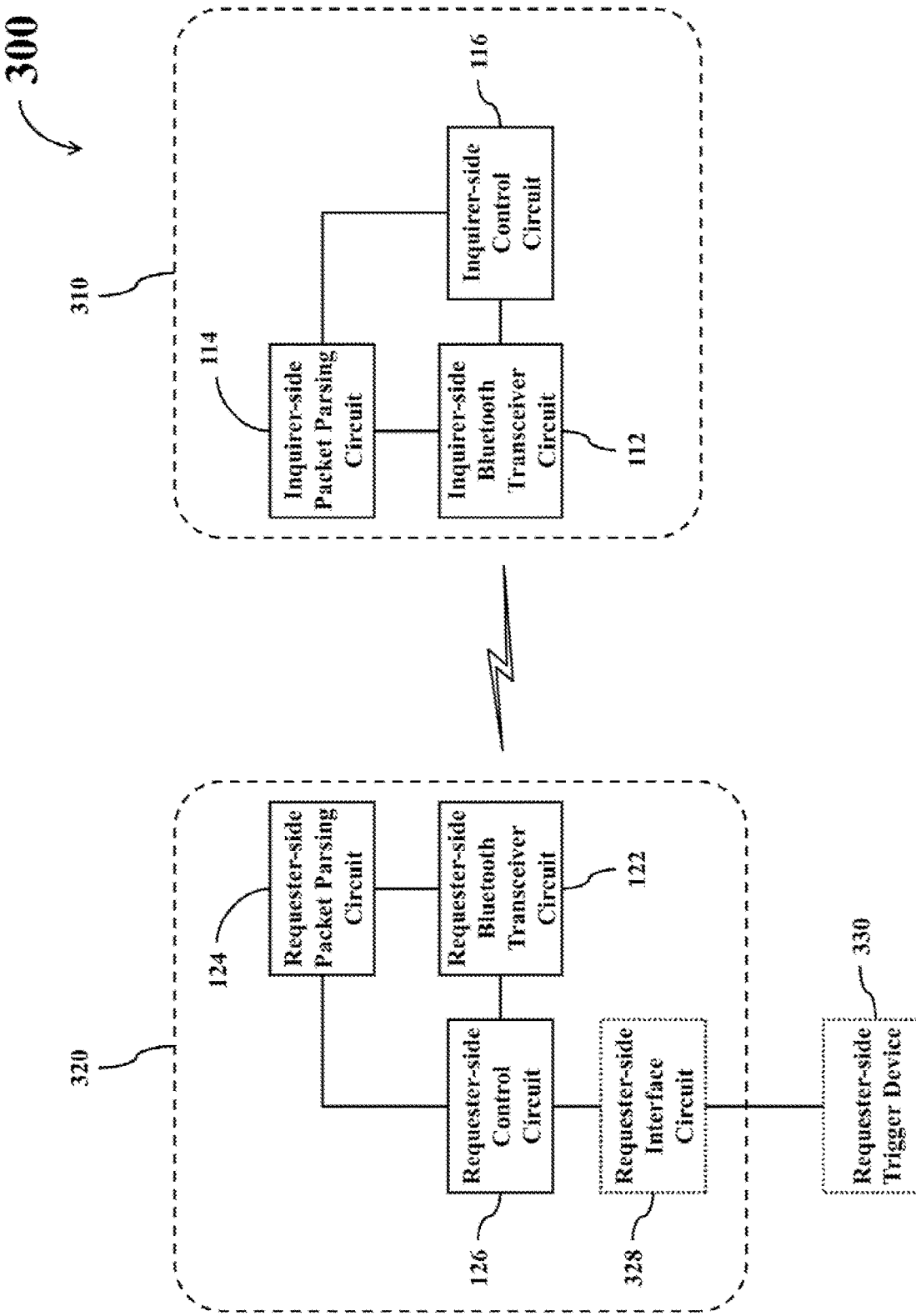
FIG. 3 shows a simplified functional block diagram of a Bluetooth communication system according to a second embodiment of the present disclosure.

For example, FIG. 3 shows a simplified functional block diagram of a Bluetooth communication system 300 according to a second embodiment of the present disclosure. The Bluetooth communication system 300 comprises an inquirer-side Bluetooth device 310 and a requester-side Bluetooth device 320. The inquirer-side Bluetooth device 310 is similar to the inquirer-side Bluetooth device 110 disclosed in the embodiment of FIG. 1, but the aforementioned inquirer-side interface circuit 118 and inquirer-side trigger device 130 are omitted in the inquirer-side Bluetooth device 310.

The requester-side Bluetooth device 320 is also similar to the aforementioned requester-side Bluetooth device 120, but a requester-side interface circuit 328 is further arranged in the requester-side Bluetooth device 320. The requester-side interface circuit 328 is coupled with the requester-side control circuit 126 and arranged to operably receive a trigger signal generated by the requester-side trigger device 330.

The aforementioned descriptions regarding the implementations, connections, and operations of other corresponding components in the Bluetooth communication system 100 are also applicable to the Bluetooth communication system 300. For the sake of brevity, the descriptions will not be repeated here.

Figure 4:
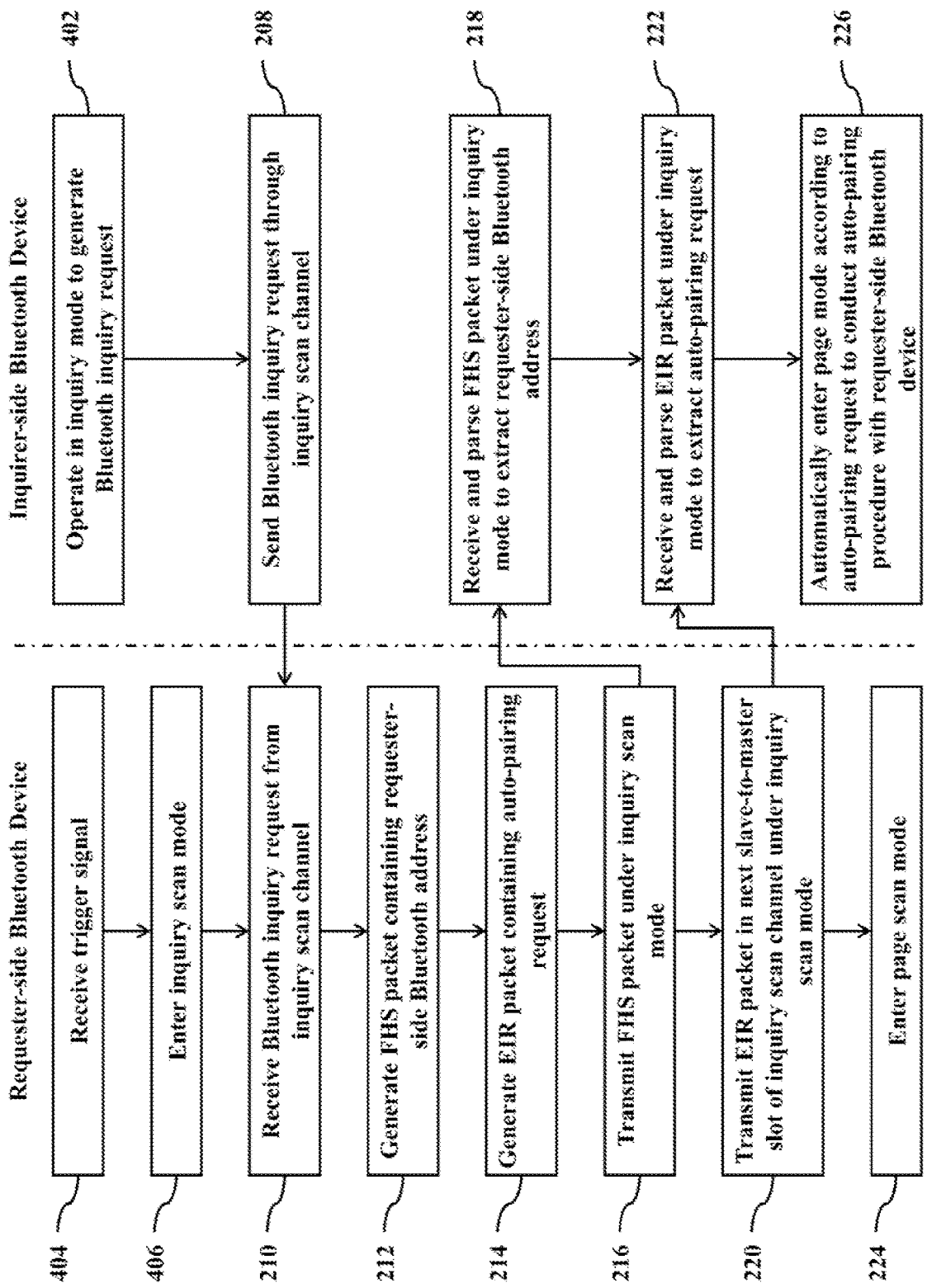
FIG. 4 shows a simplified flowchart of a method for conducting auto-pairing between Bluetooth devices according to a second embodiment of the present disclosure.

The pairing approach of the Bluetooth devices in the Bluetooth communication system 300 will be further described below by reference to FIG. 4. FIG. 4 shows a simplified flowchart of a method for conducting auto-pairing between Bluetooth devices according to a second embodiment of the present disclosure.

In the operations, the inquirer-side control circuit 116 of the inquirer-side Bluetooth device 310 may perform operation 402 in an appropriate time point based on user's manipulation or operating instructions of internal programs.

In the operation 402, the inquirer-side control circuit 116 operates in an inquiry mode to generate a Bluetooth inquiry request containing a Bluetooth address of the inquirer-side Bluetooth device 310 (hereinafter also referred to as the inquirer-side Bluetooth address).

In this situation, if the user wants to utilize the requester-side Bluetooth device 320 to conduct the Bluetooth auto-pairing procedure with the inquirer-side Bluetooth device 310, then the user may conduct a particular manipulation to the requester-side trigger device 330 to cause the requester-side trigger device 330 to generate a corresponding trigger signal. In this situation, the requester-side interface circuit 328 performs operation 404 to receive the trigger signal generated by the requester-side trigger device 330 and inform the requester-side control circuit 126.

When the requester-side control circuit 126 receives the notification transmitted from the requester-side trigger device 330, the requester-side control circuit 126 performs operation 406 to control the requester-side Bluetooth transceiver circuit 122 to enter an inquiry scan mode so as to detect whether there is any other Bluetooth device nearby sending a Bluetooth inquiry request.

In operation 208, the inquirer-side control circuit 116 controls the inquirer-side Bluetooth transceiver circuit 112 to send the Bluetooth inquiry request to other Bluetooth devices nearby through an inquiry scan channel under the inquiry mode.

In operation 210, the requester-side Bluetooth transceiver circuit 122 receives the Bluetooth inquiry request transmitted from the inquirer-side Bluetooth transceiver circuit 112 from the aforementioned inquiry scan channel under the inquiry scan mode. In this situation, the requester-side packet parsing circuit 124 parses the Bluetooth inquiry request transmitted from the inquirer-side Bluetooth transceiver circuit 112 to obtain the Bluetooth address of the inquirer-side Bluetooth device 310.

Then, the inquirer-side Bluetooth device 310 and the requester-side Bluetooth device 320 performs the operations of operation 212 through operation 226 in FIG. 4. The aforementioned descriptions regarding the other corresponding operations in FIG. 2 are also applicable to the embodiments of FIG. 4. For the sake of brevity, the descriptions will not be repeated here.

Similarly, the inquirer-side control circuit 116 can learn from the auto-pairing request transmitted from the requester-side Bluetooth device 320 that the requester-side Bluetooth device 320 permits other Bluetooth devices to conduct Bluetooth pairing with the requester-side Bluetooth device 320. Therefore, the inquirer-side control circuit 116 automatically tries to conduct the Bluetooth pairing procedure with the Bluetooth circuit corresponding to each received requester-side Bluetooth address through the inquirer-side Bluetooth transceiver circuit 112, and does not generate a list of Bluetooth devices available for connection for the user to select. In other words, the operations of the inquirer-side Bluetooth device 310 and the requester-side Bluetooth device 320 in the operation 226 do not require any user's intervention.

As can be appreciated from the foregoing descriptions, when the inquirer-side Bluetooth device 310 operates in the inquiry mode, the user only needs to conduct a simple manipulation (e.g., press a button, turn on a switch, or the like) to the requester-side trigger device 330 coupled with the requester-side Bluetooth device 320, then the requester-side Bluetooth device 320 will automatically initiate the Bluetooth pairing procedure with the inquirer-side Bluetooth device 310 and establish associated Bluetooth connections. In the entire Bluetooth auto-pairing procedure, the user does not need to issue any Bluetooth device scanning instructions, nor does the user need to select a target device to be paired, and thus it can significantly reduce the user's involvement.

Therefore, the aforementioned structure of the Bluetooth communication system 300 and the Bluetooth auto-pairing method adopted by the Bluetooth communication system 300 can effectively simplify the Bluetooth pairing procedure between the inquirer-side Bluetooth device 310 and the requester-side Bluetooth device 320, thereby improving the utilization convenience for the user.

From another aspect, in the aforementioned embodiments of FIG. 3 and FIG. 4, both the inquirer-side Bluetooth device 310 and the requester-side Bluetooth device 320 do not need to be provided with any display device, so the hardware structure, weight, and volume of both the inquirer-side Bluetooth device 310 and the requester-side Bluetooth device 320 can be significantly simplified.

In addition, since the aforementioned inquirer-side Bluetooth device 310 and the requester-side Bluetooth device 320 do not need to utilized Bluetooth advertising packets to transmit data required for the auto-pairing procedure, the inquirer-side Bluetooth device 310 and the requester-side Bluetooth device 320 do not need to switch to particular operation modes for transmitting or receiving Bluetooth advertising packets. Therefore, in the aforementioned Bluetooth communication system 300, the auto-pairing procedure between the inquirer-side Bluetooth device 310 and the requester-side Bluetooth device 320 can be accomplished in a shorter period of time.

Moreover, as described previously, if the Bluetooth chips and Bluetooth devices cannot support BLE technology, it is difficult for the Bluetooth chips and Bluetooth devices to implement the auto-pairing functionality by adopting the conventional approaches. In comparison, by adopting the aforementioned approach described in FIG. 4, even if either the inquirer-side Bluetooth device 310 or the requester-side Bluetooth device 320 does not support the BLE technology, or both the inquirer-side Bluetooth device 310 and the requester-side Bluetooth device 320 do not support the BLE technology, the auto-pairing functionality can still be implemented in the Bluetooth communication system 300.

Please note that the aforementioned executing order of the operations in FIG. 2 and FIG. 4 is merely an exemplary embodiment, rather than a restriction to the practical implementations. For example, the operation 212 and the operation 214 may be performed at the same time, or the operation 212 may be performed after the operation 214.

For another example, the operation 216 may be performed before the operation 214, or the operation 216 and the operation 212 may be performed at the same time. For yet another example, the operation 220 and the operation 214 may also be performed at the same time.

For yet another example, the operation 224 of FIG. 2 and the operation 202 of FIG. 2 may be performed at the same time, or may be performed alternately, or alternatively, the operation 224 of FIG. 2 may be performed between the operation 202 and the operation 220 of FIG. 2.

For yet another example, the operation 224 of FIG. 4 and the operation 406 of FIG. 4 may be performed at the same time, or may be performed alternately, or alternatively, the operation 224 of FIG. 4 may be performed between the operation 406 and the operation 220 of FIG. 4.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to."

The term "couple" is intended to encompass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A Bluetooth communication system (100; 300), comprising:
    an inquirer-side Bluetooth device (110; 310), comprising:
        an inquirer-side Bluetooth transceiver circuit (112);
        an inquirer-side packet parsing circuit (114), coupled with the inquirer-side Bluetooth transceiver circuit (112); and
        an inquirer-side control circuit (116), coupled with the inquirer-side Bluetooth transceiver circuit (112) and the inquirer-side packet parsing circuit (114), and arranged to operably generate a Bluetooth inquiry request and control the inquirer-side Bluetooth transceiver circuit (112) to send the Bluetooth inquiry request; and
    a requester-side Bluetooth device (120; 320), comprising:
        a requester-side Bluetooth transceiver circuit (122), arranged to operably receive the Bluetooth inquiry request;
        a requester-side packet parsing circuit (124), coupled with the requester-side Bluetooth transceiver circuit (122), and arranged to operably parse the Bluetooth inquiry request received by the requester-side Bluetooth transceiver circuit (122); and
        a requester-side control circuit (126), coupled with the requester-side Bluetooth transceiver circuit (122) and the requester-side packet parsing circuit (124), and arranged to operably generate a FHS (Frequency Hop Synchronization) packet comprising a requester-side Bluetooth address and an EIR (Extended Inquiry Response) packet comprising an auto-pairing request after the requester-side packet parsing circuit (124) parses the Bluetooth inquiry request, and to operably control the requester-side Bluetooth transceiver circuit (122) to transmit the FHS packet and the EIR packet to the inquirer-side Bluetooth transceiver circuit (112), wherein the auto-pairing request comprises indication messages or instructions that require another Bluetooth device to actively conduct a Bluetooth auto-pairing procedure with the requester-side Bluetooth device (120; 320);
    wherein the inquirer-side Bluetooth transceiver circuit (112) is arranged to operably receive the FHS packet and the EIR packet so that the inquirer-side Bluetooth device (110; 310) conducts an auto-pairing procedure with the requester-side Bluetooth device (120; 320);
    wherein the inquirer-side control circuit (116) is further arranged to operably control the inquirer-side Bluetooth transceiver circuit (112) to transmit a page request to the requester-side Bluetooth transceiver circuit (122) through a page scan channel according to the auto-pairing request and the requester-side Bluetooth address;

wherein the requester-side Bluetooth device (120; 320) does not switch to operating modes for transmitting Bluetooth advertising packets before conducting the auto-pairing procedure, and the inquirer-side Bluetooth device (110; 310) does not switch to operating modes for receiving Bluetooth advertising packets before conducting the auto-pairing procedure.

2. The Bluetooth communication system (100; 300) of claim 1, wherein the inquirer-side control circuit (116) generates the Bluetooth inquiry request and controls the inquirer-side Bluetooth transceiver circuit (112) to send the Bluetooth inquiry request through an inquiry scan channel in an inquiry mode, and the inquirer-side Bluetooth transceiver circuit (112) receives the FHS packet and the EIR packet transmitted from the requester-side Bluetooth transceiver circuit (122) in the inquiry mode;

wherein the requester-side Bluetooth transceiver circuit (122) receives the Bluetooth inquiry request from the inquiry scan channel in an inquiry scan mode, and the requester-side control circuit (126) controls the requester-side Bluetooth transceiver circuit (122) to transmit the FHS packet and the EIR packet to the inquirer-side Bluetooth transceiver circuit (112) through the inquiry scan channel in the inquiry scan mode.

3. The Bluetooth communication system (100; 300) of claim 2, wherein after the requester-side Bluetooth transceiver circuit (122) transmits the FHS packet to the inquirer-side Bluetooth transceiver circuit (112), the requester-side control circuit (126) controls the requester-side Bluetooth transceiver circuit (122) to transmit the EIR packet to the inquirer-side Bluetooth transceiver circuit (112) through the inquiry scan channel in next slave-to-master slot of the inquiry scan channel.

4. The Bluetooth communication system (100; 300) of claim 2, wherein after the inquirer-side Bluetooth transceiver circuit (112) receives the FHS packet, the inquirer-side Bluetooth transceiver circuit (112) also receives the EIR packet transmitted from the inquirer-side Bluetooth transceiver circuit (112) through the inquiry scan channel in next slave-to-master slot of the inquiry scan channel.

5. An inquirer-side Bluetooth device (110; 310) of a Bluetooth communication system (100; 300), comprising:
an inquirer-side Bluetooth transceiver circuit (112);
an inquirer-side packet parsing circuit (114), coupled with the inquirer-side Bluetooth transceiver circuit (112); and
an inquirer-side control circuit (116), coupled with the inquirer-side Bluetooth transceiver circuit (112) and the inquirer-side packet parsing circuit (114), and arranged to operably generate a Bluetooth inquiry request and control the inquirer-side Bluetooth transceiver circuit (112) to send the Bluetooth inquiry request, wherein after a requester-side Bluetooth device (120; 320) of the Bluetooth communication system (100; 300) receives the Bluetooth inquiry request, the requester-side Bluetooth device (120; 320) transmits a FHS (Frequency Hop Synchronization) packet comprising a requester-side Bluetooth address and an EIR (Extended Inquiry Response) packet comprising an auto-pairing request to the inquirer-side Bluetooth device (110; 310), wherein the auto-pairing request comprises indication messages or instructions that require another Bluetooth device to actively conduct a Bluetooth auto-pairing procedure with the requester-side Bluetooth device (120; 320);

wherein the inquirer-side Bluetooth transceiver circuit (112) is arranged to operably receive the FHS packet and the EIR packet so that the inquirer-side Bluetooth device (110; 310) conducts an auto-pairing procedure with the requester-side Bluetooth device (120; 320);

wherein the inquirer-side control circuit (116) is further arranged to operably control the inquirer-side Bluetooth transceiver circuit (112) to transmit a page request to the requester-side Bluetooth transceiver circuit (122) through a page scan channel according to the auto-pairing request and the requester-side Bluetooth address;

wherein the inquirer-side Bluetooth device (110; 310) does not switch to operating modes for receiving Bluetooth advertising packets before conducting the auto-pairing procedure.

6. The inquirer-side Bluetooth device (110; 310) of claim 5, wherein the inquirer-side control circuit (116) generates the Bluetooth inquiry request and controls the inquirer-side Bluetooth transceiver circuit (112) to send the Bluetooth inquiry request through an inquiry scan channel in an inquiry mode, and the inquirer-side Bluetooth transceiver circuit (112) receives the FHS packet and the EIR packet transmitted from the requester-side Bluetooth transceiver circuit (122) in the inquiry mode.

7. The inquirer-side Bluetooth device (110; 310) of claim 6, further comprising:
an inquirer-side interface circuit (118), coupled with the inquirer-side control circuit (116) and arranged to operably receive a trigger signal generated by an inquirer-side trigger device (130);
wherein when the inquirer-side interface circuit (118) receives the trigger signal, the inquirer-side control circuit (116) enters the inquiry mode to generate the Bluetooth inquiry request.

8. A requester-side Bluetooth device (120; 320) of a Bluetooth communication system (100; 300), comprising:
a requester-side Bluetooth transceiver circuit (122), arranged to operably receive a Bluetooth inquiry request transmitted from an inquirer-side Bluetooth device (110; 310) of the Bluetooth communication system (100; 300);
a requester-side packet parsing circuit (124), coupled with the requester-side Bluetooth transceiver circuit (122), and arranged to operably parse the Bluetooth inquiry request received by the requester-side Bluetooth transceiver circuit (122); and
a requester-side control circuit (126), coupled with the requester-side Bluetooth transceiver circuit (122) and the requester-side packet parsing circuit (124), and arranged to operably generate a FHS (Frequency Hop Synchronization) packet comprising a requester-side Bluetooth address and an EIR (Extended Inquiry Response) packet comprising an auto-pairing request after the requester-side packet parsing circuit (124) parses the Bluetooth inquiry request, and to operably control the requester-side Bluetooth transceiver circuit (122) to transmit the FHS packet and the EIR packet to the inquirer-side Bluetooth device (110; 310), so that the inquirer-side Bluetooth device (110; 310) conducts an auto-pairing procedure with the requester-side Bluetooth device (120; 320), wherein the auto-pairing request comprises indication messages or instructions that require another Bluetooth device to actively conduct a Bluetooth auto-pairing procedure with the requester-side Bluetooth device (120; 320);

wherein the inquirer-side Bluetooth device (110; 310) transmits a page request to the requester-side Bluetooth transceiver circuit (122) through a page scan channel according to the auto-pairing request and the requester-side Bluetooth address, and the requester-side Bluetooth transceiver circuit (122) is further arranged to operably establish one or more Bluetooth connections with the inquirer-side Bluetooth device (110; 310) in one or more channels after receiving the page request transmitted from the inquirer-side Bluetooth device (110; 310) through the page scan channel;

wherein the requester-side Bluetooth device (120; 320) does not switch to operating modes for transmitting Bluetooth advertising packets before conducting the auto-pairing procedure.

9. The requester-side Bluetooth device (120; 320) of claim 8, wherein the requester-side Bluetooth transceiver circuit (122) receives the Bluetooth inquiry request from an inquiry scan channel in an inquiry scan mode, and the requester-side control circuit (126) controls the requester-side Bluetooth transceiver circuit (122) to transmit the FHS packet and the EIR packet to the inquirer-side Bluetooth device (110; 310) through the inquiry scan channel in the inquiry scan mode.

10. The requester-side Bluetooth device (120; 320) of claim 9, wherein after the requester-side Bluetooth transceiver circuit (122) transmits the FHS packet to the inquirer-side Bluetooth device (110; 310), the requester-side control circuit (126) controls the requester-side Bluetooth transceiver circuit (122) to transmit the EIR packet to the inquirer-side Bluetooth device (110; 310) through the inquiry scan channel in next slave-to-master slot of the inquiry scan channel.

* * * * *